UNITED STATES PATENT OFFICE.

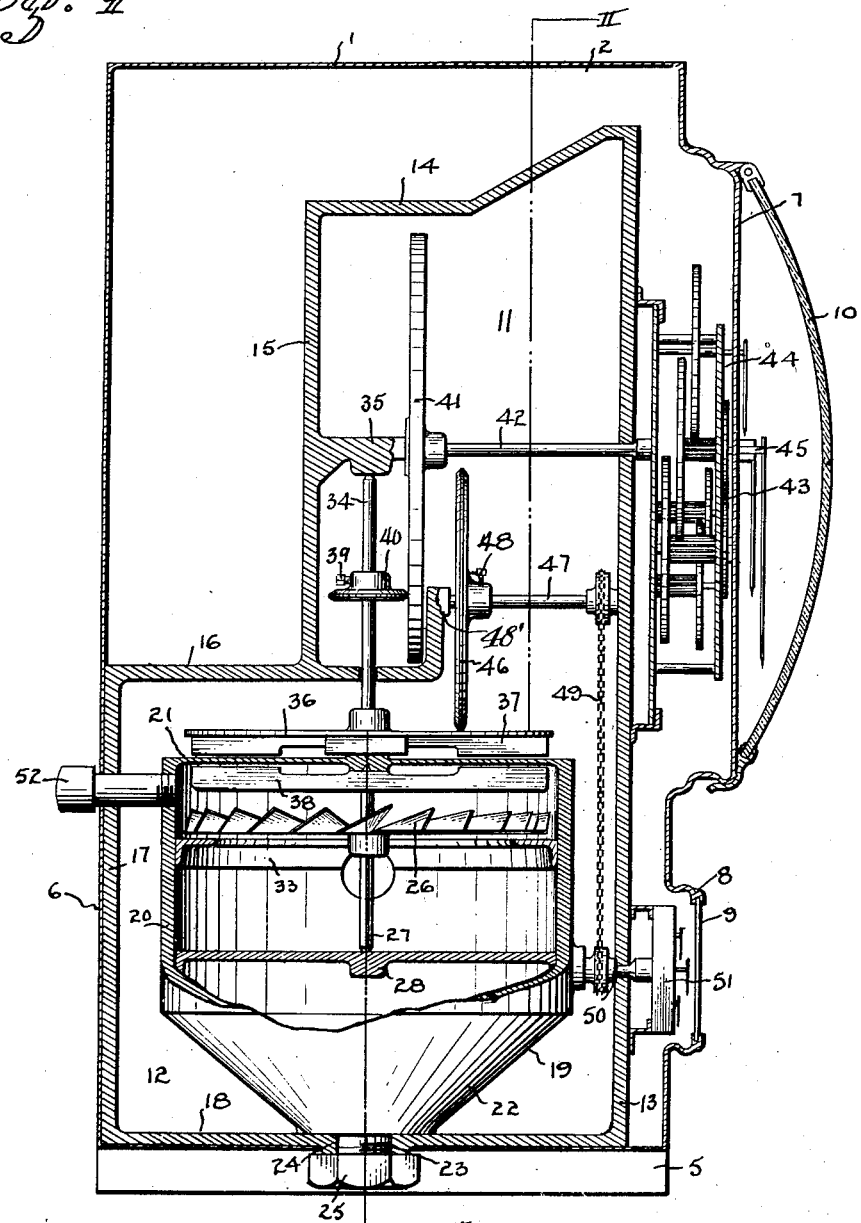

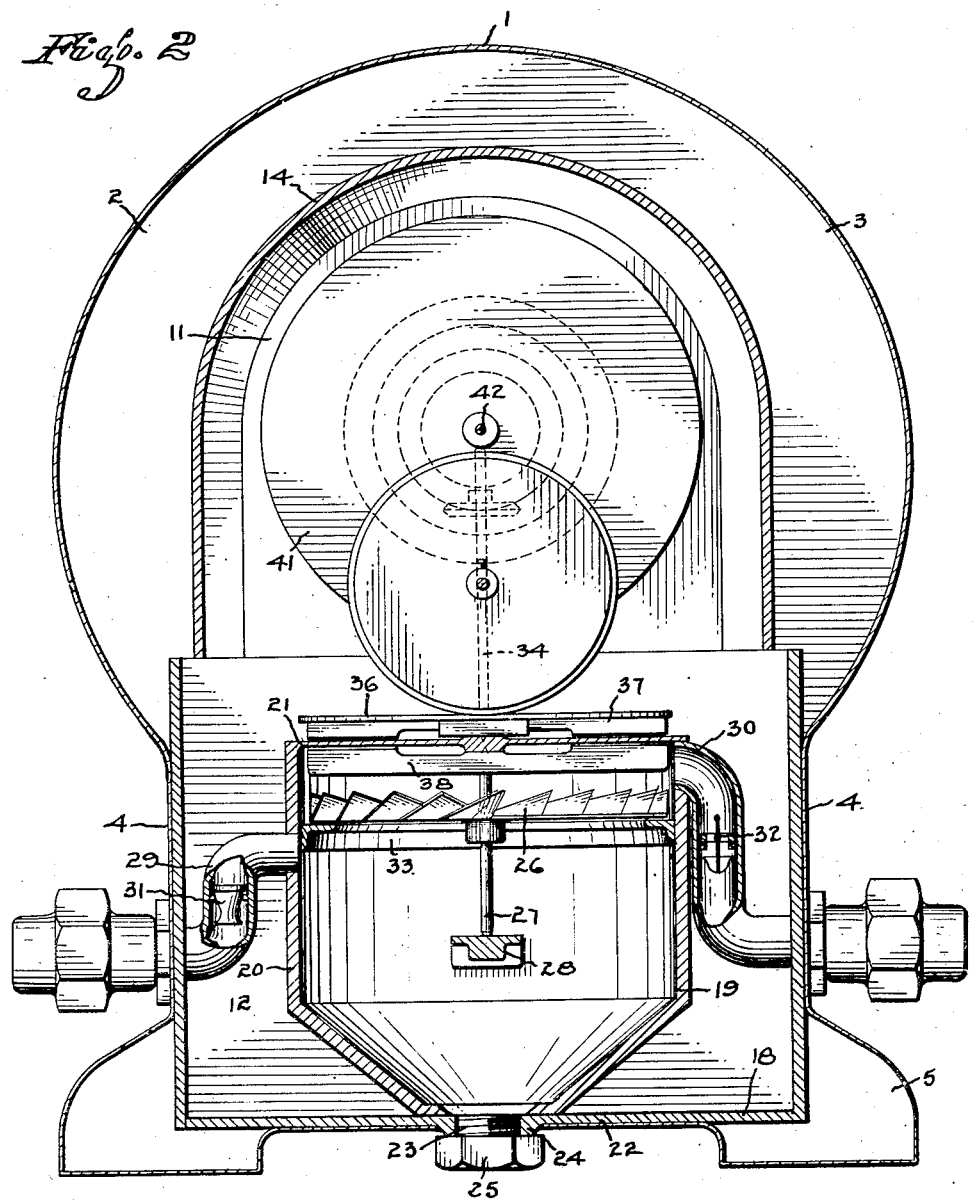

HARRY C. QUICK, OF OAKLAND, CALIFORNIA.

GAS-METER.

1,266,527.  Specification of Letters Patent.  Patented May 14, 1918.

Application filed March 30, 1916. Serial No. 87,863.

*To all whom it may concern:*

Be it known that I, HARRY C. QUICK, a citizen of the United States, and a resident of the city of Oakland, county of Alameda, and State of California, have invented a new and useful Improvement in Gas-Meters, of which the following is a specification.

This invention comprehends improvements in gas meters and relates more particularly to that type of meter which is used in residences, offices and the like, to register the volume of gas used and to indicate the cost thereof.

One of the primary objects of this invention is to provide such a meter having an improved construction in which the usual bellows are eliminated.

A further object of the invention is to provide a gas meter which may be manufactured at a greatly reduced cost as compared to the cost of production of the common type of meter now in use, and which because of its construction and the elimination of destructible materials will be very durable.

With these and other objects in view, the invention consists of certain novel features of construction, combination, and arrangement of parts as will be hereinafter fully described, illustrated and claimed.

In the drawings:

Figure 1 is a vertical sectional view through my improved meter, parts thereof being shown in elevation, and Fig. 2 is a section taken on the plane of line II—II, Fig. 1.

Referring in detail to the drawing by numerals, 1 designates the outer shell or casing having an upper part 2, provided with the arched wall 3 and a base portion 4 having the feet 5. The rear wall 6 of the shell is flat whereas the front wall is provided with the offset portion 7 which forms a dial for one of the meters or registers hereinafter described, and with an offset portion 8 which carries a sight glass 9 through which may be viewed another register also to be hereinafter described. The dial 7 is protected by a concavo-convex glass 10 having its concave side opposed to the dial so that the chamber is formed to receive the hands of the first mentioned register.

Within the shell 1 is provided the main housing or casing for the internal mechanism of the meter proper. This housing is preferably constructed of some non-magnetic metal such as brass, and is formed with an upper chamber 11 and a lower chamber 12, both of which chambers are closed on one side by the removable wall 13. The top wall 14 of the upper chamber 11 is curved somewhat as shown in Fig. 2 to conform to the curvature of the wall 3 of the shell and the rear wall 15 of this chamber is connected at its lower end to the horizontal wall 16 which forms a top wall partly covering the lower chamber 12. The rear wall 17 and the bottom wall 18 of the chamber 12 lie flush against the corresponding walls of the shell or casing 1 as clearly shown in Fig. 1.

Located within the chamber 12 is a gas receptacle or chamber 19 having a cylindrical body portion 20 closed at its upper end by the imperforate wall 21 and opening at its lower end into a funnel shaped section 22, which is pierced through its bottom wall by a short pipe 23 extending through an opening 24 in the wall 18 of the chamber 12. This pipe is externally threaded and carries a closure cap 25, as clearly shown in the drawings.

Within the gas chamber I have provided a fan or more properly a rotor 26, having a shaft 27 which is supported at its lower end by the bearing bar 28. The upper end of the shaft is pointed and is journaled in the lower face of the top wall 21 of the chamber. Gas flowing into the chamber through the pipe 29, which opens below the rotor, passes upwardly through the rotor and out through the pipe 30, that is shown in Fig. 2. A check valve 31 is provided in the pipe 29 to prevent any outward flow of gas therethrough and a check valve 32 is provided in the discharge pipe 30 to prevent an inward flow of gas. To deflect the gas from the wall of the chamber 19 so that all of it will pass through the rotor, I have provided a deflector ring 33 located just below the plane of the rotor.

Externally of the gas chamber and in longitudinal alinement with the shaft 27 I provide a shaft 34, journaled at its upper end in the extension 35 and at its lower end in the upper wall of the gas chamber. This shaft carries rigidly secured thereto a horizontal disk 36 having on its underside the magnetically responsive members 37, and to influence the members so as to rotate the disk, I provide within the gas chamber a bar magnet 38 which is rigidly secured to the shaft 27 above the rotor 26.

The upper wall of the housing 20 is reduced to such thinness as to allow the magnet 38 to exert its influence properly on the magnetically responsive element 37 to operate the indicator mechanism of the motor.

Fixed to the shaft 34 by the set screw 39 is a wheel 40 which frictionally engages and drives the larger wheel 41 rigidly secured to the shaft 42, which is journaled through the wall 13 and which connects to a train of reduction gearing 43 forming a part of the register 44, said register being of any suitable construction and having the indicating hands 45.

The horizontal disk 36 is engaged by a friction wheel 46 secured to a shaft 47 by a set screw 48. This shaft is journaled between the wall 13 and the extension 48 and drives by means of the chain 49, the main shaft 50 of a second register 51, which indicates the volume of gas consumed. This register may be of any suitable commercial construction and therefore it is not thought necessary to illustrate it or describe it in detail.

In brief, the operation of my improved meter is as follows: Gas flows into the gas chamber 19 through the pipe 29 and circulates upwardly through the vanes of the rotor 26 and out through the pipe 30 to its destination. The passage of the gas through the rotor causes the latter to rotate and the magnet 38 being fixed to the shaft 27 of the rotor also rotates and because of its magnetic influence on the ribs or elements 37 of the disk 36, the disk is correspondingly rotated and its rotation is transferred to the large wheel 41 by means of the friction wheel 40. The disk 36 also drives the shaft 47 through the medium of the friction wheel 46, and said shaft 47 as heretofore mentioned serves to drive the volume register 51.

As the price of gas varies from time to time, I have graduated the rear face of the wheel or disk 41 as indicated by the dotted lines in Fig. 2, and when a change in price is made, it is a simple matter by shifting the position of the friction wheel or disk 40 to adjust the value register to properly indicate the value of the gas consumed.

In making the initial adjustment of a meter so that the volume register 51 accurately registers the volume of gas consumed, the wheel 46 is moved longitudinally of the shaft 47 until the proper position is found, and then it is locked in that position by means of the set screw 48. The gas chamber 19 may be very easily or quickly flushed or cleaned by running hot water through the pipe 52 and out through the pipe 23.

From the foregoing description taken in connection with the accompanying drawings, it will be apparent that I have provided a very simple gas meter which may be very cheaply manufactured, which is durable, and from which there is no possible means of escape for the gas, except through the proper outlets provided therefor. While I have shown and described the preferred embodiment of my invention, it will be understood that minor changes of construction and arrangement of parts, as may suggest themselves from time to time, may be made without departing from the scope and spirit of the invention as claimed.

Having thus described this invention, I claim:

1. In a meter, a gas-tight gas chamber, a rotor journaled inside the walls of said gas chamber, means for conducting gas through said chamber to rotate said rotor, a magnet mounted within said chamber to rotate with said rotor, a magnetically responsive element and a disk journaled outside said chamber adapted to be rotated by said magnet when said magnet and rotor are rotated, a shaft journaled in said meter, a friction wheel secured on said shaft and engaging said disk for rotating said shaft, a register, and means whereby said register is operated by said shaft.

2. In a meter, a gas-tight gas chamber, a rotor journaled inside the walls of said gas chamber, means for conducting gas through said chamber to rotate said rotor, a magnet mounted within said chamber on the rotor shaft, a magnetically responsive element and a disk journaled outside said chamber and adapted to be rotated by said magnet when said magnet and rotor are rotated, a shaft journaled in said meter, a friction wheel, secured on said shaft, and engaging said disk for rotating said shaft, a register and means whereby said register is driven by said shaft.

3. In a meter, a gas-tight gas chamber, a rotor journaled inside the walls of said gas chamber, means for conducting gas through said chamber to rotate said rotor, a magnet mounted within said chamber to rotate with said rotor, a shaft journaled outside said chamber, a magnetically responsive element on said shaft adapted to be rotated by said magnet when said magnet is rotated to rotate said shaft, a register shaft, a disk on said register shaft, a friction wheel adjustably mounted on the aforesaid shaft for engaging said disk at different distances from the disk center for driving said disk and register shaft at different speeds, and a register driven by said register shaft.

In testimony whereof, I have hereunto set my hand at San Francisco, California, this 14th day of March, 1916.

HARRY C. QUICK.

In presence of—
RODNEY M. SMITH,
BALDWIN VALE.